US007983951B2

(12) United States Patent
Frohwein et al.

(10) Patent No.: US 7,983,951 B2
(45) Date of Patent: Jul. 19, 2011

(54) APPARATUS TO PROVIDE LIQUID FUNDS IN THE ONLINE AUCTION AND MARKETPLACE ENVIRONMENT

(75) Inventors: Robert James Frohwein, Atlanta, GA (US); Kathryn Tison Petralia, Atlanta, GA (US)

(73) Assignee: Kabbage, Inc., Atlanta, GA (US)

( * ) Notice: Subject to any disclaimer, the term of this patent is extended or adjusted under 35 U.S.C. 154(b) by 151 days.

(21) Appl. No.: 12/436,642

(22) Filed: May 6, 2009

(65) Prior Publication Data

US 2010/0223154 A1 Sep. 2, 2010

Related U.S. Application Data

(60) Provisional application No. 61/156,865, filed on Mar. 2, 2009.

(51) Int. Cl.
*G06Q 30/00* (2006.01)
(52) U.S. Cl. ........................................................ 705/26
(58) Field of Classification Search ................... 705/26, 705/27
See application file for complete search history.

(56) References Cited

U.S. PATENT DOCUMENTS

2005/0278244 A1* 12/2005 Yuan ............................. 705/37
2007/0015567 A1   1/2007 Schugar
2009/0024515 A1   1/2009 Collett

OTHER PUBLICATIONS http://proquest.umi.com/pqdweb?did=4709832&sid=2&Fmt=3&clientId=19649&RQT=309&VName=PQD; The electronic auctioning of servicing; McCarthy, Gene; Mortgage Banking. Washington: Dec. 1994. vol. 55, Iss. 3; p. 95, 3 pgs.*
International Search Report, PCTUS2010/025794 (counterpart to this application), Oct. 28, 2010.

* cited by examiner

*Primary Examiner* — Mila Airapetian
(74) *Attorney, Agent, or Firm* — Muskin & Cusick LLC (57) ABSTRACT

A method, apparatus, and computer readable storage to implement a lending system for use with electronic commerce web sites such as auction sites. A seller may receive a cash loan for items placed for sale but not yet purchased by a buyer. The seller can be required to pay back the loan after a predetermined amount of time or as soon as the item for sale is sold and payment is received from the buyer. The lender would charge interest or commission for the loan. In this manner, sellers can receive cash for items listed on auction sites before those items are actually sold, generating additional cash flow for the seller.

9 Claims, 9 Drawing Sheets

APPARATUS TO PROVIDE LIQUID FUNDS IN THE ONLINE AUCTION AND MARKETPLACE ENVIRONMENT

CROSS REFERENCE TO RELATED APPLICATIONS

This Applications claims benefit to U.S. Provisional application 61/156,865, filed on Mar. 2, 2009, which is incorporated by reference herein in its entirety.

BACKGROUND OF THE INVENTION

1. Field of the Invention

The present inventive concept relates to a system, method, and computer readable storage that provides a loan and corresponding cash to a seller of goods (and possibly services) in an online auction and marketplace environment.

2. Description of the Related Art

Online auctions and marketplaces, such as E-BAY and CRAIGSLIST, are known in the art and enable businesses (medium and large but often small businesses) and individuals to list items for sale on a platform that attracts (ideally) a multitude of potential purchasers. The sales process involves sellers going through a specific process to list items for sale and these items remain for sale until they are purchased, some pre-set period of time has elapsed or the item has been de-listed. Sometimes the auction or marketplace sales process can take a long period of time before the seller consummates a transaction with a buyer, the buyer provides payment to a payment intermediary (e.g., through MASTERCARD/VISA, PAYPAL, etc.) for the product purchased and the Seller receives the actual payment from the payment intermediary. This process can typically take two to four weeks.

What is needed is way in which a seller can receive instant cash for items listed for sale, even though the transaction for the item has not consummated yet.

SUMMARY OF THE INVENTION

It is an aspect of the present general inventive concept to provide a lending system which can lend funds to sellers who use an e-commerce web site.

The above aspects can be achieved by a variety of systems a preferred embodiment of which includes (a) a lending server to communicate with an e-commerce server hosting an e-commerce web site, the e-commerce web site serving web pages to visitors, allowing sellers to list items for sale and allowing buyers to bid on the items for sale; (b) a lending database in communication with the lending server to store credit profiles of users and respective credit information; and (c) a financial processing application in communication with the lending server to initiate transfer of funds using a computer communications network, (d) wherein the lending server retrieves a credit profile for the seller from the lending database and determines, based on at least both the credit profile and on characteristics of the seller's sales history on the e-commerce site or a similar e-commerce site, whether to issue a loan to the seller, and if so, then notifies the seller the loan is available and the terms of such loan, and if the seller accepts the loan then using the financial processor to transfer a loan amount to the seller.

The above aspects can also be obtained by a system that includes (a) a lending server, to communicate with an e-commerce server hosting an e-commerce web site, the e-commerce web site serving web pages to visitors, allowing sellers to list items for sale and allowing buyers to bid on or purchase the items for sale; and (b) a financial processing application in communication with the lending server to transfer a loan to a borrowing seller against an item for sale on the e-commerce web site by the borrowing seller using a computer communications network; (c) wherein an investing seller uses the e-commerce web site to transfer investment money to a lending account owned by the lender in return for repayment of the investment money with interest, wherein the lending account comprises funds used to fund the loan to the borrowing seller which is processed by the financial processing application.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

Inventive concepts described herein can be used in conjunction with electronic auction and online marketplace systems, such as those described in U.S. patent application Ser. Nos. 11/776,059; 11/646,934; and 11/167,999, all three of these applications are incorporated by reference in their entireties.

When a seller places item(s) for sale on electronic auction site (such as ebay) or online marketplace site (such as AMA- ZON stores), the seller will hopefully receive a buyer for those items, and hence receive a payment from the buyer. During the period between when the seller lists an item for sale and when the funds related to such sale are ultimately received by the seller (from a buyer), the seller may be receptive to an offer to borrow funds. For example, if a seller is selling a television for a $100 fixed price, while the seller is waiting for a buyer of the television the seller may wish to borrow an amount (e.g., $50) from a lender in anticipation of the eventual sale. When the seller then sells the television, and eventually receives the $100 from the buyer, then the seller can repay the $50 to the lender. The borrowing and repaying of such a loan can all be accomplished electronically and seamlessly in the context of an electronic commerce system, thus providing an easy way for sellers to maintain cash flow while items are being sold. It should be noted that, in an embodiment, a loan to the seller can be structured as a fixed amount thirty day loan (meaning the seller has 30 days to repay the loan plus a fixed amount as a fee and/or interest amount). There may be no requirement that the item actually sells. Further, the amount loaned may be in some fixed proportion to the amount anticipated to be generated by the seller, but this proportion may change or the amount loaned may even be wholly unrelated to this anticipated sales price.

An e-commerce system can be any online e-commerce system that is used to buy/sell goods, including auction sites such as eBay. However, the methods and systems described herein can be applied to non-auction sites as well that sell items at fixed prices (or any site where a seller can list an item for sale).

Figure 1:
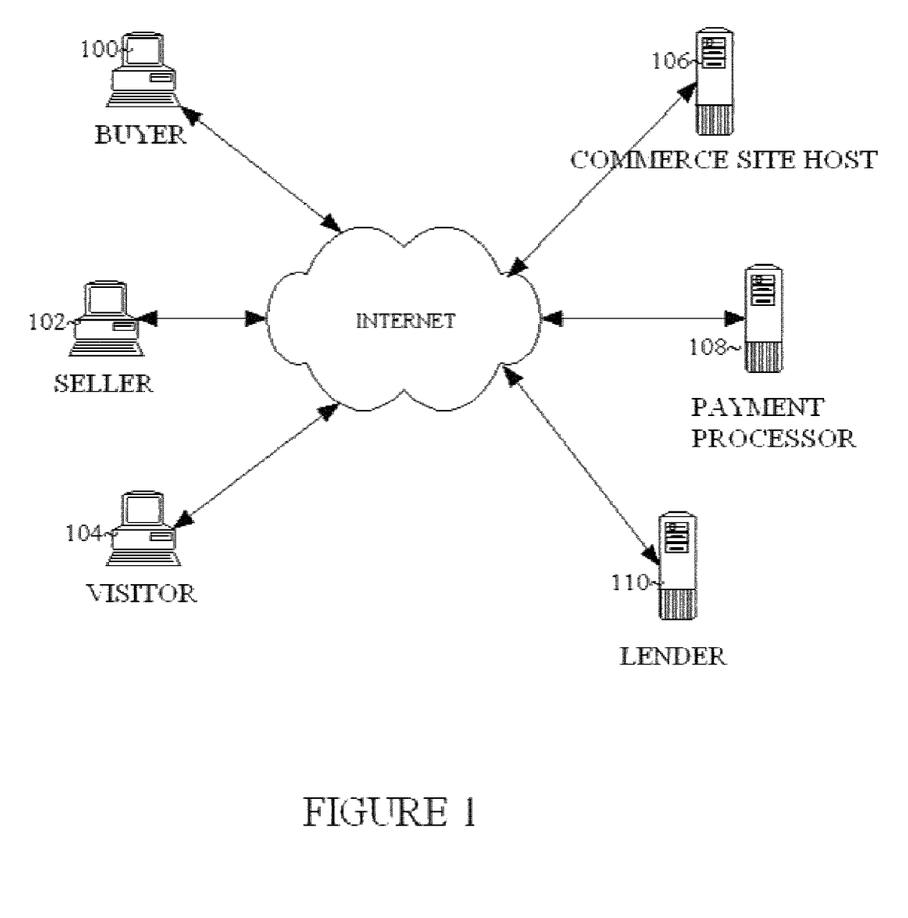
FIG. 1 is a block drawing of an e-commerce system, according to an embodiment.

FIG. 1 is a block drawing of an e-commerce system, according to an embodiment.

Users of a commerce site such as Buyer 100, seller B 102, and visitor C 104 (and any other users) can interact with the commerce system via a commerce system host 106 through a computer communications network such as the Internet. The commerce system host 106 can serve web pages which can be viewed through the users' browsers, which can allow the users to interact with the commerce system using a graphical user interface and buy and/or sell products. Products for sale can have fixed prices, their prices can be determined by auction or there may be a combination of an auction with fixed price for buying the auction item and ending the auction early (e.g. a "BUY IT NOW" on EBAY).

A seller 102 can list their item(s) for sale on the commerce site through the commerce site host 106. A buyer 100 can view items for sale on the commerce site through the commerce site host 106. A visitor 104 can use the commerce site for any purpose and is not required to list an item for sale or purchase one.

Once the seller 102 lists his or her item for sale, then the lender 110 can learn of the auction listing in any number of manners. The seller 102 would have typically pre-registered with the lender 110 via the lender's online web site. At the time of registration, the lender 110 may scan multiple auction and online marketplace sites and identify items then currently listed on such sites. Once identified, the lender 110 may make an offer to the seller 102 with respect to one or more of such listings. After registration and upon further listing of items, the seller 102 may be notified of an opportunity to take a loan on a listed item in a number of ways. For example a plug-in running on the seller's computer (or browser) can transmit a new listing to the lender 110. Alternatively, the lender 110 can on an irregular, regular or continuous basis poll the commerce site host 106 to evaluate the current sellers and their items to determine any new listings by the particular seller 102. It should be noted that the lender 110 may poll more than one site, in the event that the lender makes loans available to sellers that list products via multiple commerce site hosts.

Once the lender 110 is aware of the new listing by the seller 102, then the lender 110 can determine whether to make a loan offer to the seller 102. More on this determination will be discussed below in more detail. If the lender 110 decides to make a loan offer to the seller 102, then the loan offer is presented to the seller 102. The loan offer can be in the form of an email to the seller, a pop-window, a text message on the seller's cell-phone, or any other known method of communication. The loan offer may also contain other terms of the loan, for example, a $100 loan that must be paid back within 30 days (or some other time period), the amount of the repayment due in 30 days, the implied interest rate of the loan, etc.

Once the buyer 100 receives the loan offer, the buyer 100 can make a decision to accept or decline the loan offer, and transmit the decision back to the lender 110. If the buyer 100 accepts the loan offer then the lender 110 can use a payment processor 108 to provide the loan funds to the seller 102. The payment processor 108 can be any type of entity that is capable of transferring funds electronically from one party to another and this system may be housed either with the lender, with a sponsor bank or via a third party (or via any other commercially acceptable approach). For example, the payment processor 108 can be a bank that wires money from the lender's account 110 to the seller's account 102, an electronic payment processor such as PAYPAL as well as via ACH. The seller can also be issued a debit card or credit card or other financial instrument into which the loaned funds can be transferred. There are also many other options for payment that are known in the art or may become available in the future.

The seller 102 can then sell the item and receive the proceeds from the sale. The seller 102 can then repay the loan to the lender 110, using any of the electronic payment methods mentioned herein or that may otherwise be available to the seller. Note that repayment of the loan is typically not dependent on the sale of the item, that is, the seller 102 still must meet the repayment terms of the loan to the lender 110 regardless of whether the item is actually sold or not. The loan may or may not carry an interest rate so that the seller 102 would have to pay the lender 110 more than the lender 110 originally loaned the seller 102 (as with most commercial loans). This additional amount may not be interest, but rather may come in the form of a fee (either on a flat basis or dependent upon the size of the transaction such as a certain amount per $100 of money loaned).

In this manner, sellers utilizing an auction or online marketplace (or other e-commerce site), can receive funds quickly (and potentially immediately depending upon the manner in which the funds are transferred) while their listed item(s) are at auction (or sale), and then can repay the loan. Even though the sellers will have to pay fees and/or interest on the loan funds they receive, it may be worth it to them to ensure that they have adequate cash flow to continue their operations, purchase additional inventory or pursue new business opportunities.

Figure 2:
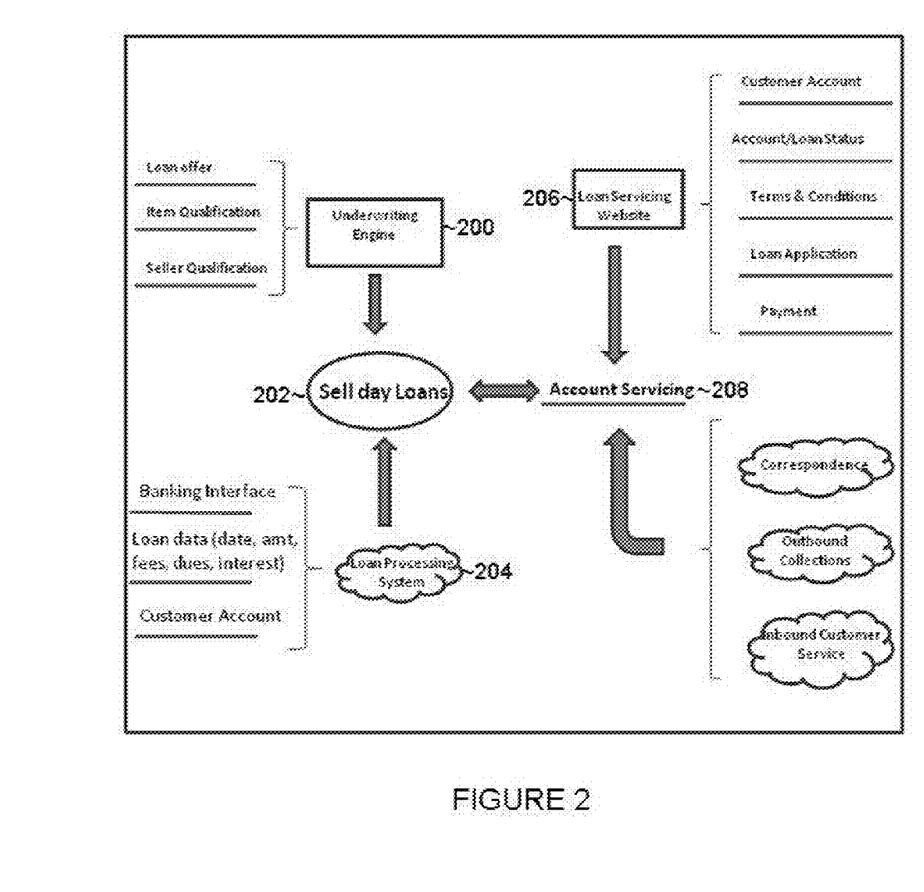
FIG. 2 is a block diagram illustrating components associated with a lender, according to an embodiment.

FIG. 2 is a block diagram illustrating components associated with a lender, according to an embodiment. The lender 110 in FIG. 1 can comprise a number of different components.

A loan processing system 204 can provide basics of account and loan servicing, which can be delivered using a hosted service using an application service provider (ASP) model. Borrowers can access the loan processing system 204 via a web browser and can log on to their customer account to with a graphical interface that can display loan data (e.g., date, amount, fees, dues, interest, etc.)

An underwriting engine 200 provides for monitoring of items for sale on the auction site and gathers data on the past item sales and the seller offering the item(s) for sale. The underwriting engine can contain the risk model for assessing sellers and items and establishing the loan offer. The underwriting engine 200 pulls data from disparate information sources which may include information from one or more credit bureaus (e.g., EQUIFAX, TRANSUNION, etc.), EBAY or other merchant site seller rating information, and/or PAYPAL account information, and item information that relates to the particular item against which the prospective loan is being applied. For example, item information that relates to the particular item can comprise a comparison of the item being sold to the same or similar items on the auction site and can include information such as condition of the item, selling prices for comparative items and information regarding the likelihood of the seller selling the item.

Account servicing 208 may include correspondence, outbound collections, inbound customer service. These three functions may be outsourced to service providers. The loan servicing web site 206 can provide can allow the customer (borrower) to access all of their respective account information.

All of these components can cooperate in order to facilitate the selling of loans 202 to borrowers.

Figure 3:
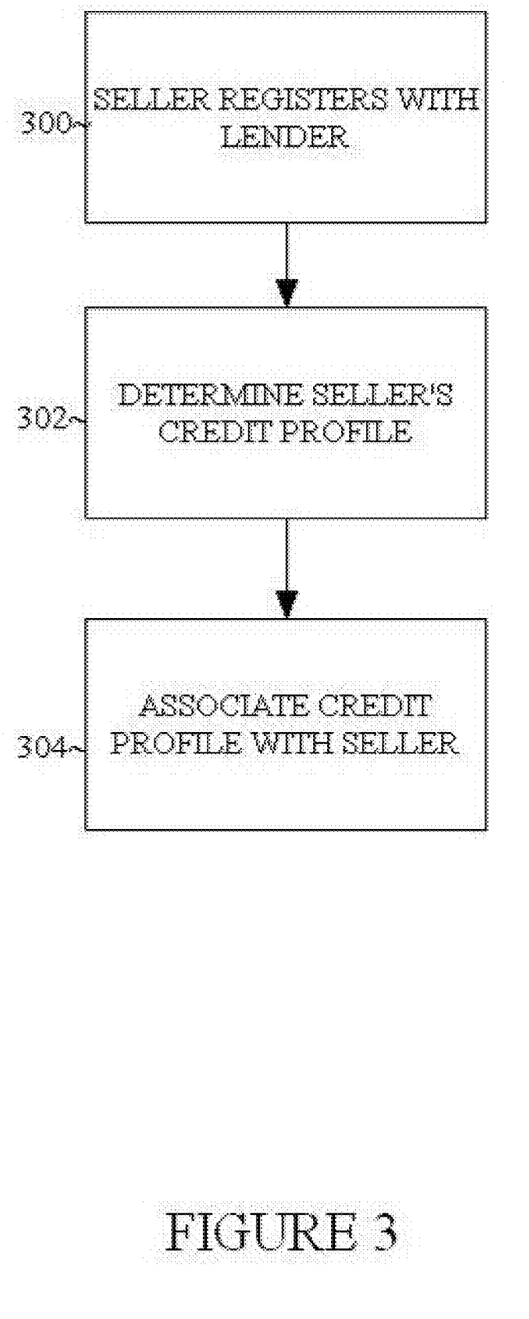
FIG. 3 is a flowchart illustrating an exemplary method of registering a seller with a lender, according to an embodiment.

FIG. 3 is a flowchart illustrating an exemplary method of registering a seller with a lender, according to an embodiment.

At the time, or before, a lender can loan money to a seller in the manner described herein, the seller should typically register with the lender (although in an alternative embodiment, registration is not required). Registration allows the seller to identify themselves to the lender and allows the lender to perform an evaluation of the seller's credit profile among other things, such as reviewing their seller rating on an online marketplace or reviewing the item(s) listed for sale on various online marketplaces. The credit profile is a rating of the seller's credit history in order to determine the lender's ability to lend money to the seller.

The method can begin with operation 300, wherein the seller registers themselves with the lender. This can be done as known in the art, wherein the seller can visit the lender's web site (using a web browser) and enter information about themselves (personally and/or their company), which can comprise information such as their name, social security number, company name, products sold, address, bank accounts, usernames on auction sites, auction listings, etc.

From operation 300, the method can proceed to operation 302, which determines the seller's credit profile. A credit profile is a compilation of a borrower's history repaying loans made to them by other lenders, and can be used by the lender to determine whether to lend the seller money.

A seller's history is related to the seller's credit profile (as the term is used in the art which comprises a record at one of the national credit bureaus), but the seller's history may also incorporate additional information. For example, the seller's history may incorporate a user's rating on an auction or online marketplace site (such as EBAY), complaints received, volume of items sold, dollar amount of items sold, etc. Incorporating such factors into the seller's credit profile can help the credit profile make a more accurate representation of the risk involved in lending a particular seller money.

For example, consider two sellers who have equal standard FICO credit scores (as determined by one of the credit bureaus). The first seller sells has an EBAY positive EBAY seller rating of 99.5% and sells an average of $5,000 in merchandise a week on the auction site while the second seller has an EBAY positive EBAY seller rating of 95.0% and sells an average of $1000 in merchandise a week on the auction site. The profile of the first seller would of course be more favorable to (a) granting a loan because this seller is more highly rated than the second seller, and (b) may receive more credit ultimately from the lender because the first seller has more cash flow from which to repay the loan. However, both sellers may receive loans, but the terms of these loans may be different (e.g., the first seller may receive a higher loan amount, lower fees, etc.).

Although the credit profile of the seller that is listing an item for sale is used to determine whether to extend credit to the seller and, also, important terms of a credit offer (if made), the credit profile may not be the only information used when making a lending determination. The lender may also take into consideration factors related to the item being listed for sale, such as the item category, the likelihood that the item will be sold, the expected sales price of the item, the auction reserve (if applicable), external market conditions and many other factors. In addition, the lender may consider the number of other items listed by the seller (on one or more auction/online marketplace sites) and the historical sales of the seller. For example, when the seller sells an actual item, that item can be associated with a request for a loan and characteristics of that item (e.g., sale price, likelihood of the item being sold in 30 days, etc.) can be factors in the decision of whether to grant the seller the loan. Thus, the lender may compute its own score of the seller (independent of another credit score such as a FICO score) that can take into consideration any of the information described herein and would be helpful to the seller in making the decision whether to lend.

From operation 302, the method proceeds to operation 304, which associates the credit profile determined in operation 302 with the seller in a database. Whenever a decision is to be made whether or not to grant the seller a loan, the seller's credit profile can be retrieved in the database (which is associated with the lender) in order to facilitate that decision. Additional risk management efforts may also be undertaken at such time such as updating the information contained in the seller's credit profile.

Figure 4:
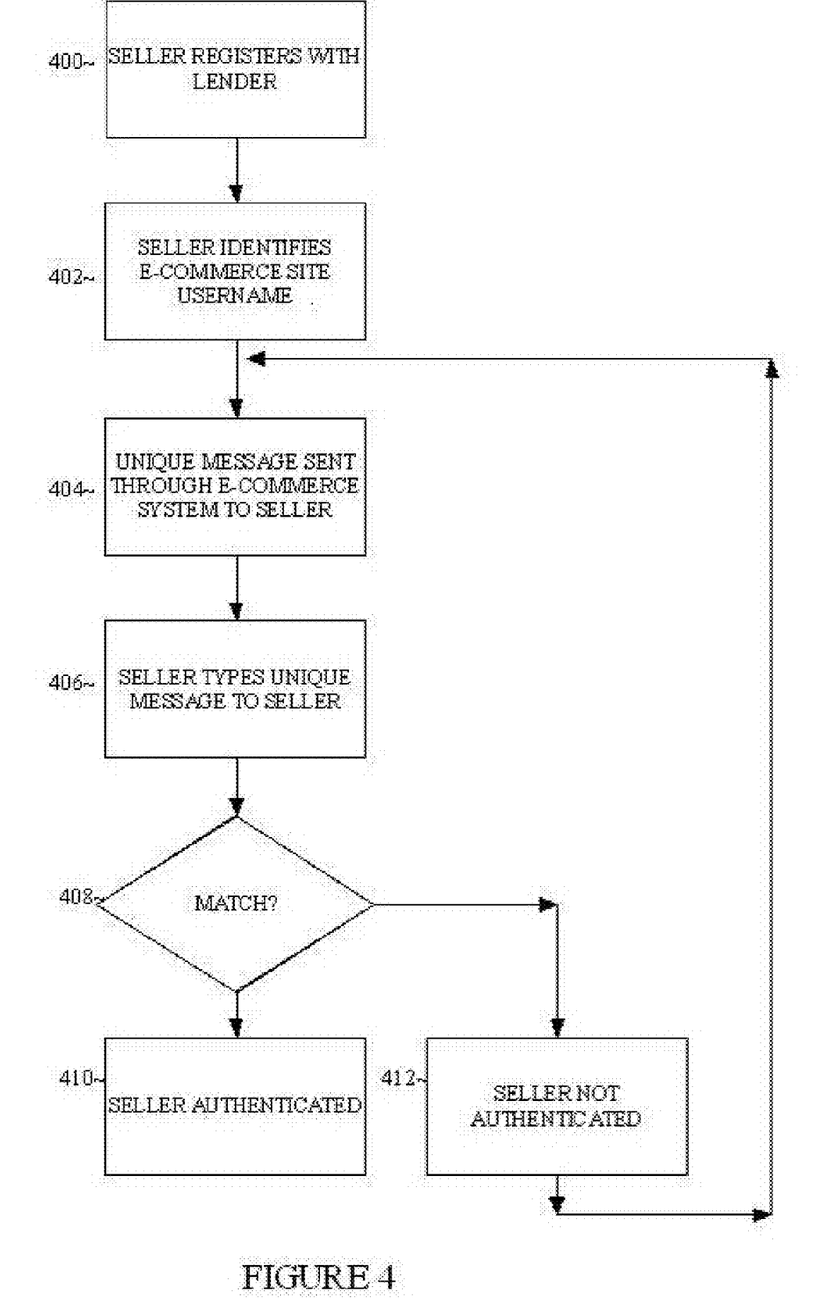
FIG. 4 is a flowchart illustrating an exemplary method of a seller authenticating his or her auction site account with a lender during registration with the lender, according to an embodiment.

FIG. 4 is a flowchart illustrating an exemplary method of a seller authenticating his or her auction on online marketplace site account with a lender during registration with the lender, according to an embodiment. It is noted that a seller may sell using more than one auction or marketplace site, and each site the seller sells on can be individually authenticated. Thus, the seller's different usernames/accounts over different auction sites can all be authenticated and associated with the seller's account.

When a seller registers with the lender, it may be desirable that the seller verify that the seller is actually who the seller claims to be. For example, a fraudulent party could register with the lender (using the registration process illustrated in FIG. 3) and claim to be an unrelated seller on the auction or online marketplace site, thereby causing unauthorized transactions. Thus, at any point during the registration process illustrated in FIG. 3, the lender can authenticate the seller by, for example, requiring the seller to type a unique message during the seller's authentication process that would be transmitted only to the identified party on the auction or online marketplace site through the auction or online marketplace site communications system. Thus, if the seller does indeed possess the username on the auction site that the seller claims, then only the seller would receive the unique message and can verify whether or not the activity noted is authorized.

The method can start with operation 400, wherein the seller registers with the lender, as illustrated in FIG. 3.

From operation 400, the method proceeds to operation 402, wherein the seller identifies to the lender the seller's username (or other identifier of the seller's account on one or more auction and online marketplace site(s)). In this example, each user of the auction/online marketplace site has a unique username and thus can be identified by that username. In addition, after registration and upon future listings with corresponding loans, a verification may be sent to the seller via, once again, the auction/online marketplace communication system that is associated with the particular seller and the respective item being listed that is associated with the loan.

From operation 402, the method proceeds to operation 404, wherein the lender sends a unique message (can be a randomly generated code, a unique web link, etc) to the seller through the auction or online marketplace site's communication system (more than one message may be sent, of course, if the seller utilizes more than one auction/online marketplace through which to sell items). For example, a user of the auction or online marketplace site can enter a message and a username of the auction site (or click on a communications link), and the auction site will deliver the message to the owner of the username (typically by sending an email to the owner containing the message). Thus, if the seller does own the username on the auction site, then the seller would receive the unique message, otherwise the seller would not.

From operation 404, the method proceeds to operation 406, wherein the seller types the unique message received in operation 404 into his or her computer that is then transmitted to the lender's server which is processing the login/authentication process. Instead of (or in addition to) typing a message, the seller may also click on a link delivered to the seller (such as via email) to complete the authentication process that can then direct the seller's browser to a unique URL where the seller can then complete the authentication. Financial accounts that are provided by the seller can also be verified by depositing a small random amount into the account (e.g., thirteen cents) and then the seller can provide to the system the amount of the deposit, or by commercially available instant account verification providers whereby the user's banking login is used to verify account ownership. From operation 406, the method proceeds to operation 408, which determines whether the unique message entered by the seller in operation 406 matches the unique message transmitted in operation 404. As stated above, a unique URL can also be provided to the seller that contains a tracking code which confirms that the seller has visited the unique URL.

If there is a match, then the method proceeds to operation 410, wherein the seller is authenticated and can continue the registration process and be allowed to use the lender's services. The authentication process (operations 404-412) can be repeated for each auction or marketplace site that the seller uses (and has identified to the lender).

If there is not a match, then the seller is not authenticated and the method can return to operation 404 where the authentication can be retried. It is noted that there may be more than one site involved, and each site can be verified/authenticated as described herein, and sites that have not successfully been authenticated can be retried.

Figure 5:
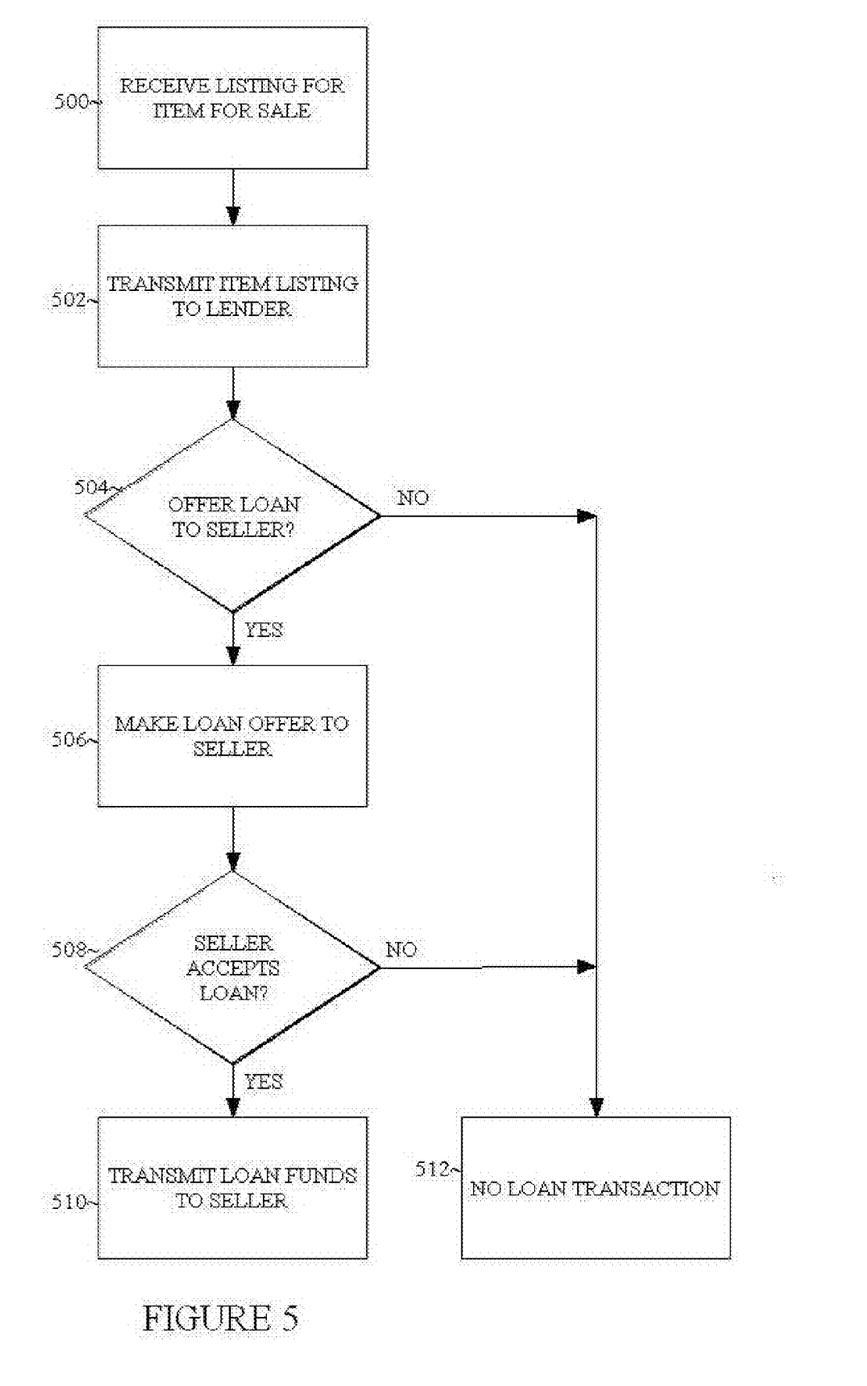
FIG. 5 is a flowchart illustrating an exemplary method of making a loan from a lender to a seller using an auction site, according to an embodiment.

FIG. 5 is a flowchart illustrating an exemplary method of making a loan from a lender to a seller using an auction or online marketplace site, according to an embodiment.

The method can begin with a seller listing an item for sale on an auction or online marketplace site (including via storefront technology). This can be done as known in the art, for example, the seller logging on to his account on the auction or online marketplace site, and filling out a form describing the item for sale and its parameters (e.g., sale price, reserve, etc.). This can also be accomplished via automated listing software products.

From operation 500, the method proceeds to operation 502, which transmits the item listing to the lender. This can be done in numerous ways. The seller can have a plug-in that would automatically transmit the item listed in operation 500 to the lender (e.g. browser plug in technology). Alternatively, the lender can continuously traverse the auction or online marketplace web site (manually or preferably with the use of a robot) to render appropriate data on existing auctions or listings (or via an application program interface), thereby automatically determining when the seller (which is known to the lender via the registration process in FIG. 3) is listing a new item. The seller can also manually notify the lender when the seller has listed a new item for sale.

From operation 502, the method proceeds to operation 504, which determines whether to offer a loan to the seller. More on this determination will be discussed below. If the loan is declined, then the method proceeds to operation 512, wherein there is no loan for this item.

If in operation 504, the loan is approved, then the method proceeds to operation 506, which makes a loan offer to the seller. The loan offer can come in many forms, such as an email message, a pop-up screen on the seller's computer, SMS message, etc.

From operation 506, the method proceeds to operation 508, which determines whether the seller accepts the loan. The seller can indicate to the lender his or her acceptance or rejection of the loan in a number of ways, such as e-mail, clicking a button on a web form, etc. If the seller declines, then the method proceeds to operation 512, wherein there is no loan processed for this item.

If in operation 508, the seller accepts the loan offer, then the method can proceed to operation 510, which transmits the loan funds to the seller. This can be done using any method described herein (or not described), such as PAYPAL, ACH, wire transfer, direct deposit, placement of funds on a debit card, etc.

Instead of the funds being paid directly to the seller, the seller can opt to have the funds distributed to other channels. For example, loaned funds can go directly into an investment account designated by the seller. In this way, the seller can invest money that will be generated from item sales before the items are actually sold. Alternatively, the loan payments can be directly credited to pay off the seller's credit card or other debts (including other debts owed to the lender).

When a seller accepts a loan, the lender can also check to see if the seller has any other items for sale on the auction site, and if so, the lender can complete operations 504-512 again for each item for sale by the seller to potentially make other loans for other items that the seller has for sale. These loans can be combined and offered jointly to the seller.

Figure 6:
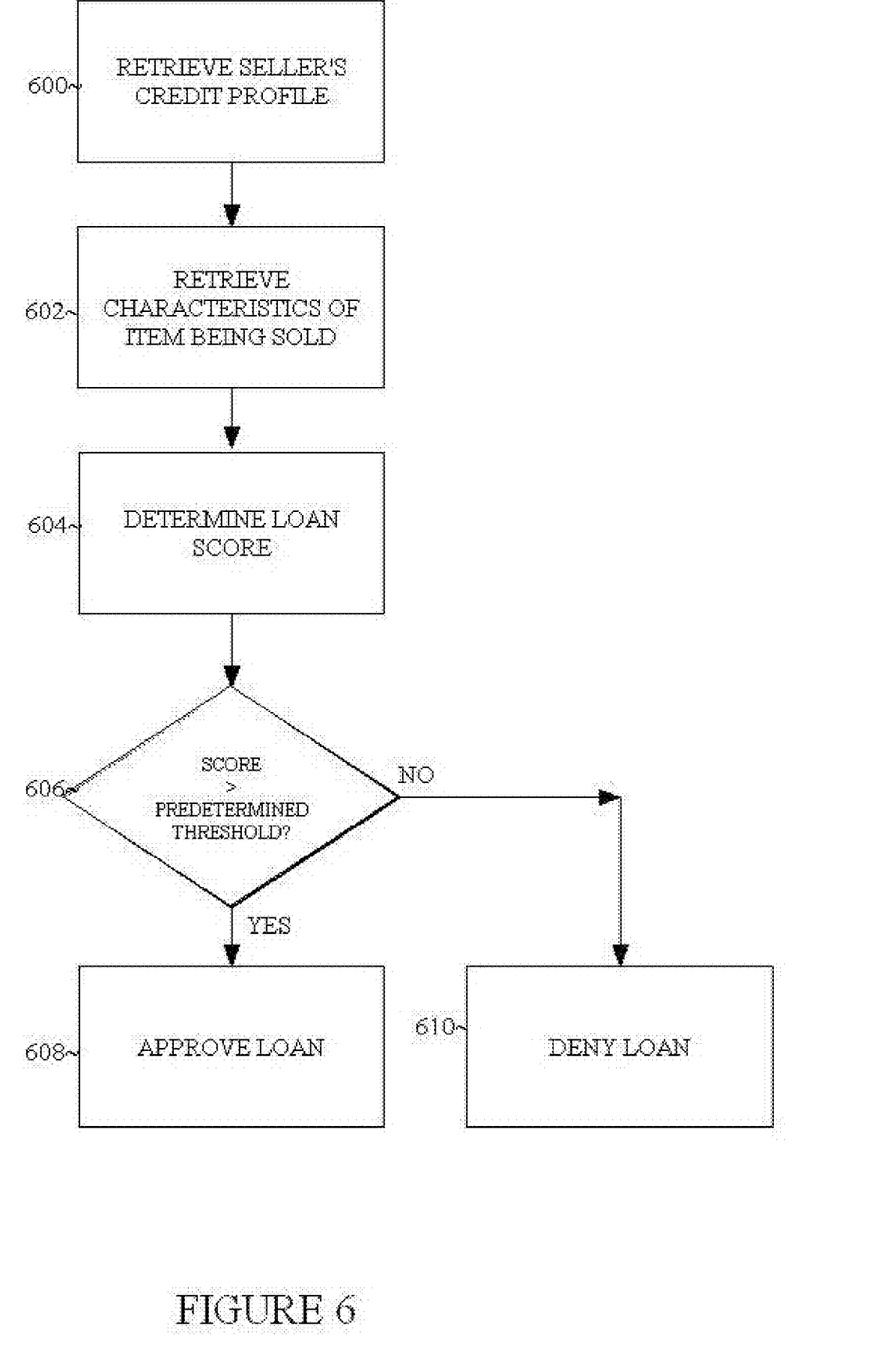
FIG. 6 is a flowchart illustrating an exemplary method of determining whether to grant or deny a loan, according to an embodiment.

FIG. 6 is a flowchart illustrating an exemplary method of determining whether to grant or deny a loan to a seller, according to an embodiment. It is noted that a loan transaction can be associated with a particular item or items for sale by the seller, and approval or denial of the loan can be based on characteristic(s) of the item(s). "Wallet data" can be used to make loan decisions, which can comprise credit bureau data, bank, credit cards, or other data that might be found on a consumer's person. Non-wallet data is information that is not typically readily available, such as a mortgage lender, auto lender, or the amount of other installment or personal loans, and is a very strong indicator that the applicant is not fraudulent. Non-wallet data comprises characteristics that can verify identity, but are not included in a credit score. A loan determination can be made using wallet data and/or non-wallet data. Combining both wallet data and non-wallet data can result in a higher accuracy in determining credit-worthy borrowers for loans described herein. In an alternative embodiment, a loan can be approved or denied without taking into consideration the particular item being sold by the seller.

The method begins with operation 600, which retrieves the seller's credit profile. The credit profile can be stored on a server or database associated with the lender, such as lender 110. This credit profile contains data about the seller but may or may not contain data about the seller's current item for auction.

From operation 600, the method can proceed to operation 602, which retrieves characteristics of the item being sold. These characteristics can be obtained from the auction or online marketplace site itself. The item being sold that is associated with the loan can be identified by the seller's auction username and the name of the item (or time the item was listed, auction number, or other identifier of the item). Alternatively, the seller can have a direct link to the auction site that can directly retrieve item characteristics using a transfer protocol (such as XML) without the need to scrape the auction site.

From operation 602, the method proceeds to operation 604, which determines a loan score. The loan score can be a numerical value which can be correlated with a probability that the seller will be able to repay the loan within a predetermined amount of time (e.g., 30 days). The loan score can be made up of a combination of factors such as the seller's credit score originated from a major credit bureau, the seller's EBAY or other online marketplace rating, the seller's merchant and/or PAYPAL account information and information related to the item to be sold (such as information related to the likelihood it will sell and what it will sell for). From this information, the lender can determine whether to make a particular loan to a seller, and the terms of the loan, but, in addition, perhaps the maximum aggregate amount of all loans that may be made to the seller at any given time.

Factors that can be incorporated into the loan decision (which may be present in the credit profile or may be determined contemporaneously with the loan decision) can comprise the volume (dollar amount and/or number of items sold) of sales the seller has been generating. If the seller is a successful seller on the auction site, then the seller may be considered to be more likely to sell the item being listed/offered for sale. Another factor that can be used is the seller's feedback rating on the auction site. Auction sites commonly employ user feedback mechanisms that allow buyers to rate their experiences with sellers. A seller with a relatively good feedback rating might be considered to be more reputable, and hence, more likely to sell the item being sold as well as more likely to pay the loan back based on his or her good reputation.

From operation 604, the method proceeds to operation 606, which determines whether the loan score is greater than a predetermined threshold (or alternatively less than a predetermined threshold) and if not, then the method proceeds to operation 610, which denies the loan.

As part of the loan approval process, the lender can also check with other lending entities that may loan money based on items for sale on the same auction site to see if they have loaned money based on the same item. If so, the lender may not wish to lend money against such item(s).

If from operation 606 the score meets the predetermined condition(s) (e.g., greater than or less than a predetermined number), then the method proceeds to operation 608, which approves the loan and determines the nature of the offer to make to the seller related to the item listed. Depending upon the seller analysis conducted and the item analysis conducted, the lender determines the terms of the offer, which may include the amount of the loan, the repayment terms, the fees to be charged and other terms of the loan.

Although many companies use typical credit bureau information to determine whether to make a loan or not, in one embodiment, a lender will make its credit decisions based on the credit bureau and additional information not typically associated with making a loan decision such as EBAY (or other marketplace) seller rating, and some verification information regarding the item that the seller is intending to sell online (such as the likelihood the item will sell and for the amount for which it is likely to sell). Therefore, the lender may set up three (or any number of) factors that make up a composite risk score for a seller seeking a loan. As one example, the lender may attribute a 70% weight to the credit bureau (FICO score, but normalized to a 500 to 1000 scale, with, for example, an 850 score or above equaling a 1000 and a score below 500 equaling 500 and all other scores spread evenly between such points) of the seller, 20% weight to the seller rating (on EBAY, for example, which may range from a 1 to 1000, with 1000 representing a positive seller score of 100% and at least 500 reviews and 0 equaling a seller score below 92% or less than 500 reviews) and 10% weight to other factors such as the likelihood that the item will sell (on a 1 to 1000 basis, with 1000 being highly likely and zero being unlikely). These of course are merely examples and other factors and scales can be used. The lender may be looking for an overall aggregated score of 600 in order to definitely make an offer to the seller.

For example, consider that a seller has a FICO score of 675, a seller rating of 96% (with at least 500 reviews) and a 50% for likelihood of selling the item. Since in this example 500 is the floor (for 500 points) and 850 is the ceiling (for 1000 points) then the scaled point range of 500 (1000–500) divided by 350 (850–500) approximately equals 1.429 scaled points per FICO point. Thus, for a FICO score of 675, then (675–500)*1.429+500=750. Multiplying 750*70% (the weight of this factor)=525 points attributed to the FICO component of the composite score. The seller rating component is computed similarly: (1000)/(100–92)=125 scaled points per seller rating, thus for a seller rating of 96%, (96–92)*125=500, taking 20% (the weight of the second factor) of 500=100 points attributed to the seller rating component of the composite score. Regarding the third component, the 50% likelihood of selling the item, (1000–0)/100=10 scaled points per percentage point of likelihood of selling the item. Thus, in this example, since the likelihood of selling the item is 50%, 50*10=500, and taking 10% of 500=50, the third component of the composite score (the likelihood of selling the item) is 50 points. Adding 525 plus 100 plus 50=675 points for the composite score. If the lender will only lend to seller's with a score above 600, the foregoing example would result in an offer to the seller. This score may also be critical for determining what the nature of the offer will be, with higher scores resulting in better (less expensive to the seller) offers. Of course, this score may have to be combined with other factors, such as some determination of how much (at any one time) the lender will be willing to lend funds to the seller as well as the seller's history of repayment to the lender.

In addition, some of the above items may also contribute to the nature of the offer provided. Once a decision has been made to make a loan to the seller, the terms of the loan offer must be decided. The seller score (in the example above, 585) may be important in this regard. In addition, other factors, such as the amount that is anticipated to be generated from the sale of the item, the other loans that seller has from the lender or from others, and experiences with other sellers through lender's platform may all contribute to determining the amount of the offer to make to seller and the fees and other terms of that offer.

Figure 7:
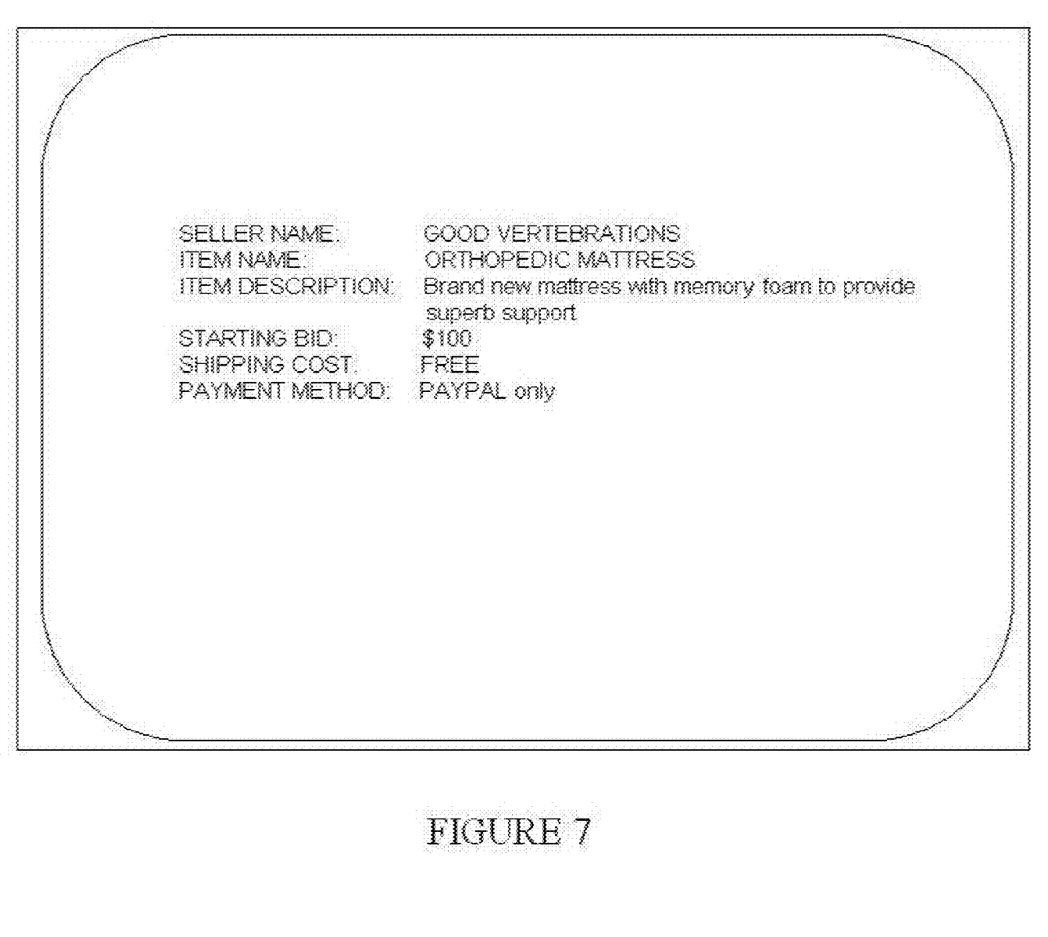
FIG. 7 is a drawing of an input screen used by a seller to enter item information into an e-auction site, according to an embodiment.

FIG. 7 is a drawing of an input screen used by a seller to enter item information into an e-auction site, according to an embodiment.

When a seller lists an item for sale, the seller typically inputs item characteristics into the auction site so that the auction site can properly list the item to visitors (potential buyers). The seller name is the seller's account name with the auction site and typically is typically not changed. Other characteristics can be entered which are associated with the sale of the item, such as the name of the item, description, starting bid, shipping cost, payment method, whether the item has a "buy it now" price, etc.

Figure 8:
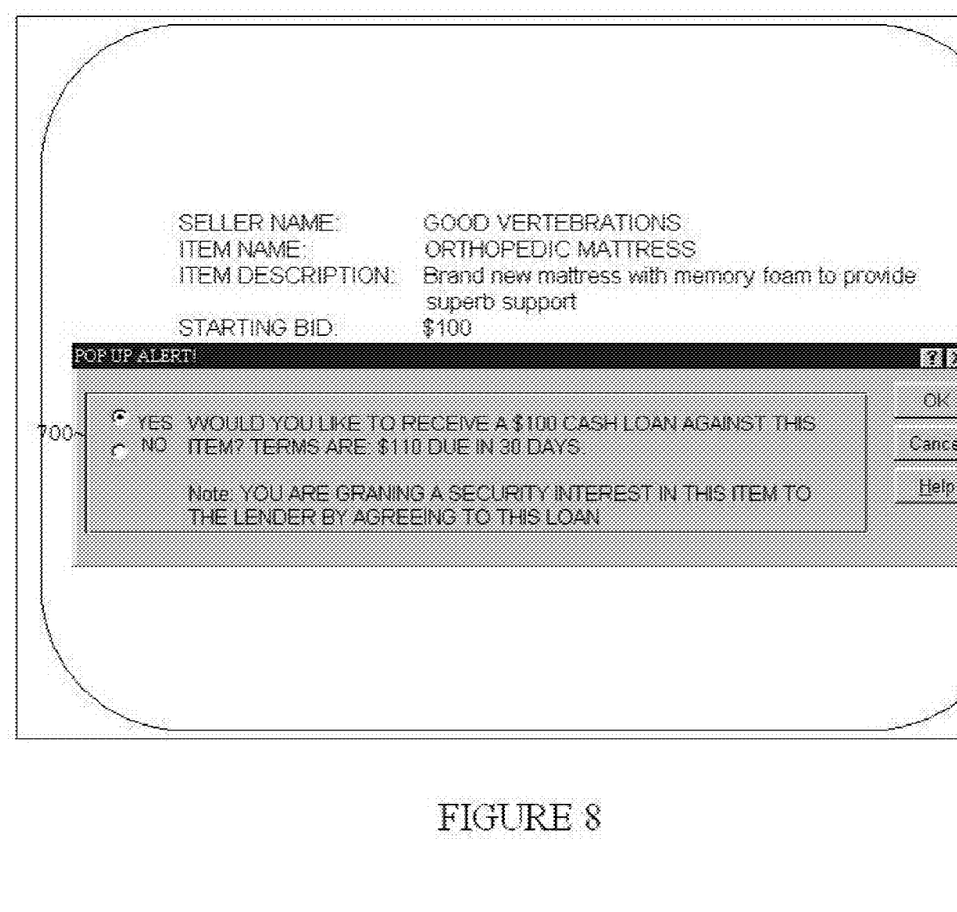
FIG. 8 is a pop-up screen indicating the availability of a loan against an item listed for sale, according to an embodiment.

FIG. 8 is a pop-up screen indicating the availability of a loan against an item listed for sale, according to an embodiment.

When an item is listed with an auction or online marketplace site, a pop-up screen may automatically appear 800, which asks the user whether the user wishes to receive a loan against the item listed. The pop-up screen (in an alternative embodiment, this may be a sidebar or other manner of providing some interface to the seller in order to offer a loan) is initiated by the lender after a determination is made by the lender to offer a loan (see operation 506). The pop-up screen (or other interface approach) may appear promptly after the seller lists the item with the auction or online marketplace site (which would typically require a direct communication via the seller or the auction or online marketplace site and the lender). The pop-up screen (or other interface approach) can also appear to the seller at a later point in time, when the lender ascertains that the seller has listed a new item by continuously scraping the auction/online marketplace site for additional data regarding the lender's registered users (or via an API).

Once a loan is made against an item and the item is sold, the funds from the sale may go from the buyer to a payment intermediary (like PAYPAL or a credit card company) and then to the seller and then the seller. On or before 30 days after the loan, the seller would be obligated to pay the lender back for the loan. In a further embodiment, the funds from the sale can be paid directly to the lender. This can be accomplished by the seller designating in the payment information for the item listing that payment would be made to the lender's account, not the seller's. The lender may thus (or may not, depending on the lender) require that payment for the item be made directly to the lender. In yet another embodiment, the lender may be able to take funds directly from the seller's PAYPAL, merchant or bank account.

The lender may, but does not have to receive a security interest in the item the loan is made against. In an alternative embodiment, the lender can retain a security interest in the items being sold as collateral for the loan funds. For example, if a seller is selling a painting, and receives a cash loan against the painting, the seller may retain a security interest in the painting. Thus, if the painting is not sold by a certain date, then either 1) the painting must then be shipped to the lender unless the seller pays the loan off as agreed, or 2) the proceeds from a sale of the painting (when it is sold) on the auction site must be paid directly to the lender. The seller should typically be made aware of the security interest before the seller agrees to the loan (such as in the pop-up window illustrated in FIG. 7). In an alternative embodiment, the lender may group security interests in a group of items for sale or may have a security interest in the seller's accounts receivable.

In a further embodiment, the seller who takes a loan from the lender can have the loan money directly paid into a special account. For example, the loan money can go directly to pay off the seller's credit card, or it can go directly into an investment account. Similarly, a seller who gets paid directly from a buyer can also have money automatically rolled into a special account, such as an investment account or to pay off a credit card or other debt.

In another embodiment, sellers may decide to have funds received via the sale of items online (or just other cash they may have) funneled into an investment fund, wherein such money is used by a lender to make the loans to sellers that are described herein. Money provided by sellers can also be directly used to fund/invest in a peer to peer lending site.

Figure 9:
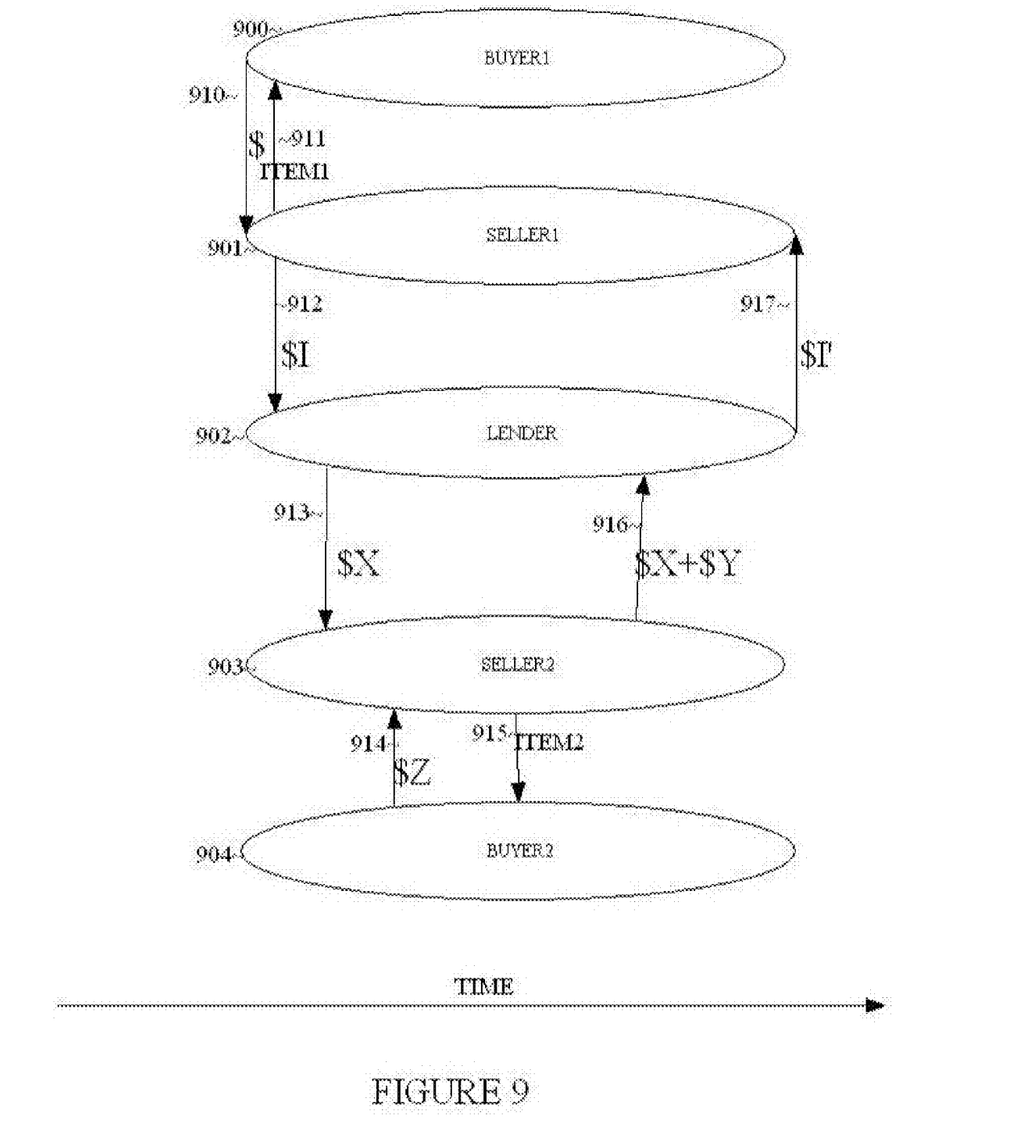
FIG. 9 is a flow diagram illustrating flows of items and cash between parties, according to an embodiment.

FIG. 9 is a flow diagram illustrating flows of items and cash between parties, according to an embodiment.

Buyer1 900 is a buyer on an auction site and arranges to buy item1 from seller1 901 on the auction site. Thus, buyer1 900 pays seller1 901 a cash amount 910 for item1 911 that is shipped from seller1 901 to buyer1 900. Seller has now collected the cash amount and keeps it. Seller1 wishes to invest in a fund operated by lender 902 that lends money to sellers (as described herein). Therefore, seller1 901 transfers investment $I to lender 902. Investment money $I can be pooled by the lender with other investor money and is used to make loans to other sellers on the auction site who wish to borrow against items for sale (as described herein).

Seller2 903 places an item (item2) up for auction on an auction site (not pictured). Lender 902 makes a loan 913 of $X to seller2 903 against item2. Buyer2 904 pays $Z 814 to seller 903 in exchange for seller2 to ship item2 915 to buyer2 904. Note that typically, the amount of the loan $X is less than the purchase cost of the item2 ($Z). It is also possible that the loan amount $X can be equal to the purchase cost of item2 $Z. While unusual, it is also possible that the loan amount $X can be greater than the purchase cost of item2 $Z. After seller2 has received the payment of $Z 914, then seller2 can repay the loan of $X 913 to the lender 902. Seller2 903 would typically also pay back interest (or commission, surcharge, etc.) $Y on the loan, so that the seller2 903 pays the lender 902 a payback 916 of $X (the original loan amount)+$Y (the interest and/or fee).

Over time, the seller1 901 can pay back seller1 901 a return 917 (designated as $I') on seller1's 901 original investment of $I 912. The return $I' 917 can be the original investment amount $I plus interest (and/or a fee) or it can alternatively be a dividend payment while the original investment $I remains in the possession of lender 902 (until the seller1 requests it back or by other agreement). The point to note here is that seller1 901 is a typical seller on the auction site and instead of receiving payments from buyers directly, these payments can go to invest in the lender's 902 fund, thereby ideally providing additional profit to the seller1 901.

In a further embodiment, a marketplace bureau or clearinghouse can be maintained which tracks items sold on all known auction sites. Before a loan is made against a particular item being sold, the item can be checked in the clearinghouse in order to ensure that no other loan has been made against that item by another lender. If a different lender has made a loan against the same item, then the current lender may refuse to loan against that item. This situation can be similar to a car owner taking a loan against the title of his or her car and then trying to get another loan against the same car with a different lender. Multiple loans against the same item can cause problems for the lenders since the probability of having both paid back becomes higher than for a single loan. The clearinghouse can comprise a clearinghouse database that is in communication with all lenders that participate in the clearinghouse. Each time a loan is made against an item, the clearinghouse database stores the item (and its characteristics such as its auction site, seller's username, any unique auction ID numbers, and any other identifying information). When a seller wishes to make a loan against an item, it can query the clearinghouse database with information identifying the item to find out if the item exists in the clearinghouse and if there are any outstanding loans against the item made by other lenders. If there is an outstanding loan, then the lender may typically refuse to make the loan.

Thus, an advantage of the methods described herein is that they can optimize cash flow for participants on an auction (or other e-commerce) site. Sellers that need cash loans to maintain their cash flow can borrow against their products can receive such loans (albeit while paying something additional for the privilege of receiving the instant money), while sellers that have extra cash can invest in a lending fund, thereby earning them additional interest. This entire system serves to improve everyone's overall experience on the auction site by assisting sellers to stay in business (for those low on cash flow) or to make more money (for those that have extra cash to lend). It also provides value to the auction sites by increasing the amount of items listed for sale on the auction site because the sellers have additional funds with which to purchase inventory.

Any component, server, database, computer, etc., described herein can also be split up to comprise multiple components in a same or different locations (connected by a communications network). Thus, for example, while the commerce site host is referred to and pictured herein as one unit, it can actually exist over different databases, servers, processors, storage devices, entities, etc. Any connection described herein can either be a direct connection or indirection connection through other nodes or components (either described herein or not). Further, any component or unit described herein can communicate with any other component or unit described herein, whether such communication is explicitly described herein or not.

Anywhere "auction," "e-auction," "electronic auction" are used herein, other types of commerce sites can be used interchangeably, such as non-auction sites where items can be listed at a fixed price (e.g., CRAIGSLIST, AMAZON Stores, etc.).

It is noted that the order of any of the operations described herein can be performed in any order. Any operation described herein can also be optional. Any embodiments herein can also be stored in electronic form and programs and/or data for such can be stored on any type of computer readable storage medium (e.g. CD-ROM, DVD, disk, etc.).

The descriptions provided herein also include any hardware and/or software known in the art and needed to implement the operations described herein. All components illustrated herein may also optionally communicate with any other component (either illustrated/described herein or not described but known in the art).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system to transfer a loan amount of a loan to a seller who lists an item for sale on an e-commerce web site, the system comprising:
   a lending server to communicate with an e-commerce server hosting the e-commerce web site, the e-commerce web site comprising web pages that allows sellers to list goods for sale and allows buyers to bid on or purchase the goods for sale;
   the lending server being in communication with a lending database that stores credit profiles of parties comprising respective credit information; and
   the lending server being in communication with a financial processing application to initiate transfer of funds using a computer communications network,
   wherein the lending server is configured to retrieve a credit profile associated with the seller from the lending database and make a determination, based on at least both the credit profile and on characteristics of the seller's sales history on the e-commerce web site, whether to approve the loan to the seller, and upon approval, notify the seller the loan is available and terms of the loan, and upon acceptance by the seller, use the financial processing application to transfer the loan amount to the seller,
   wherein the seller is permitted to use the loan amount to improve the seller's cash flow or other purpose.

2. The system as recited in claim 1, wherein the determination of whether to approve the loan also takes into consideration characteristics of the item for sale by the seller on the e-commerce web site with which the loan would be associated.

3. The system as recited in claim 1, wherein the loan is secured by the item.

4. The system as recited in claim 1, wherein when the seller sells the item via the e-commerce web site, payment for the item is paid directly to an account associated with the lending server.

5. The system as recited in claim 1, wherein if the lending server determines to approve the loan, the lending server triggers an alert that appears on the seller's computer indicating availability of the loan and prompting the seller for acceptance or refusal.

6. The system as recited in claim 5, wherein the alert is a pop-up window.

7. The system as recited in claim 1, wherein the determination of whether to approve the loan is based in part on the seller's sales volume on the e-commerce web site.

8. The system as recited in claim 1, wherein the determination of whether to approve the loan is based in part on the seller's feedback rating on the e-commerce web site.

9. The system as recited in claim 1, wherein a lending pool of money is maintained to fund loans which comprises the loan, wherein the lending pool is funded in part by investing sellers using the e-commerce web site who transfer at least some of their funds to the lending pool.

* * * * *